US010559837B2

(12) United States Patent
Usami et al.

(10) Patent No.: US 10,559,837 B2
(45) Date of Patent: Feb. 11, 2020

(54) FLUID CONTROL VALVE

(71) Applicants: NISSAN MOTOR CO., LTD., Yokohama-shi, Kanagawa (JP); Kabushiki Kaisha Saginomiya Seisakusho, Tokyo (JP)

(72) Inventors: Takatada Usami, Kanagawa (JP); Tsuyoshi Takeda, Saitama (JP); Ichiro Okawara, Saitama (JP)

(73) Assignees: NISSAN MOTOR CO., LTD., Yokohama-shi, Kanagawa (JP); KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 301 days.

(21) Appl. No.: 15/121,086

(22) PCT Filed: Jan. 26, 2015

(86) PCT No.: PCT/JP2015/052023
§ 371 (c)(1),
(2) Date: Aug. 24, 2016

(87) PCT Pub. No.: WO2015/133200
PCT Pub. Date: Sep. 11, 2015

(65) Prior Publication Data
US 2016/0365587 A1    Dec. 15, 2016

(30) Foreign Application Priority Data

Mar. 7, 2014   (JP) ................................ 2014-045174

(51) Int. Cl.
*H01M 8/04223*    (2016.01)
*F16K 31/06*    (2006.01)
(Continued)

(52) U.S. Cl.
CPC ..... *H01M 8/04231* (2013.01); *F16K 31/0672* (2013.01); *F16K 51/00* (2013.01);
(Continued)

(58) Field of Classification Search
CPC ......... H01M 8/04231; H01M 8/04089; H01M 8/0662; H01M 8/0687; H01M 2008/1095;
(Continued)

(56) References Cited

U.S. PATENT DOCUMENTS

2012/0107711 A1* 5/2012 Tomita ............. H01M 8/04388
429/446
2012/0285131 A1* 11/2012 Osawa ............. H01M 8/04097
55/300
(Continued)

FOREIGN PATENT DOCUMENTS

JP       S60-73999 U    5/1985
JP       H06-39112 U    5/1994
(Continued)

*Primary Examiner* — Eugenia Wang
(74) *Attorney, Agent, or Firm* — Drinker Biddle & Reath LLP

(57) ABSTRACT

A fluid control valve is connected to a wet gas flow passage in order to control a flow of a wet gas, and includes an introduction passage for introducing the wet gas into the fluid control valve, a filter including mesh for removing foreign matter contained in the wet gas flowing through the introduction passage, a discharge passage that includes a valve port disposed above the introduction passage and discharges the wet gas that has passed through the filter from the fluid control valve through the valve port, and a valve portion that opens and closes the valve port using a valve body. In this fluid control valve, the filter is disposed in a lowermost portion of the introduction passage.

5 Claims, 9 Drawing Sheets

(51) Int. Cl.
  *H01M 8/0662*  (2016.01)
  *H01M 8/04089*  (2016.01)
  *F16K 51/00*  (2006.01)
  *H01M 8/1018*  (2016.01)

(52) U.S. Cl.
  CPC ..... *H01M 8/04089* (2013.01); *H01M 8/0662* (2013.01); *H01M 8/0687* (2013.01); *H01M 2008/1095* (2013.01); *H01M 2250/20* (2013.01); *Y02T 90/32* (2013.01)

(58) Field of Classification Search
  CPC . H01M 2250/20; F16K 51/00; F16K 31/0672
  See application file for complete search history.

(56) References Cited

U.S. PATENT DOCUMENTS

| | | |
|---|---|---|
| 2014/0220462 A1 | 8/2014 | Takeda et al. |
| 2015/0044582 A1 | 2/2015 | Chikugo et al. |
| 2016/0013509 A1 | 1/2016 | Iwasaki et al. |

FOREIGN PATENT DOCUMENTS

| | | |
|---|---|---|
| JP | H11-9880 A | 1/1999 |
| JP | 2002-373698 A | 12/2002 |
| JP | 2005-177331 A | 7/2005 |
| JP | 3112488 U | 8/2005 |
| JP | 2005-243476 A | 9/2005 |
| JP | 2006-153221 A | 6/2006 |
| JP | 2007-280892 A | 10/2007 |
| JP | 2011-258396 A | 12/2011 |
| JP | 2013-258038 A | 12/2013 |
| WO | WO 2013/035609 A1 | 3/2013 |
| WO | WO 2013/118719 A1 | 8/2013 |
| WO | WO 2013/137271 A1 | 9/2013 |

* cited by examiner

FLUID CONTROL VALVE

TECHNICAL FIELD

This invention relates to a fluid control valve.

BACKGROUND ART

JP2011-258396A discloses a purge valve as an example of a fluid control valve disposed in a wet gas flow passage in order to control a flow of the wet gas. The purge valve is used in a fuel cell system, and is opened when anode off-gas discharged from a fuel cell is discharged to the exterior of the fuel cell system.

SUMMARY OF INVENTION

A fluid control valve such as a purge valve is made to control a flow of fluid by opening and closing a valve port that connects a fluid introduction passage to a fluid discharge passage by means of a valve body. When a flow of wet gas containing moisture is controlled by this type of fluid control valve, the valve port must be positioned above the introduction passage in consideration of water infiltration.

Water may infiltrate the introduction passage from the wet gas flow passage after the system using the fluid control valve is stopped. When the valve port is disposed below the introduction passage, the water infiltrating the introduction passage may be guided into the valve port by gravity, and in a low temperature environment, the valve port and the valve body may freeze while the system is stopped. If the valve port and the valve body freeze while the system is stopped, the flow of wet gas cannot be controlled when the system is subsequently activated.

It should be noted, however, that when the valve port is disposed below the introduction passage, the water infiltrating the introduction passage can be discharged into the discharge passage through the valve port using gravity by opening the valve port during a system operation. In other words, purging can be performed simply by opening the valve port during a system operation.

When the valve port is disposed above the introduction passage, however, the water cannot be discharged by gravity simply by opening the valve port during a system operation.

Therefore, when the valve port is disposed above the introduction passage, the introduction passage is formed in a curved shape projecting downward in a gravitational direction, for example, so that the water accumulates in the curved portion. As the water accumulates in the curved portion, the accumulated water blocks the introduction passage. By opening the valve port once the introduction passage becomes blocked in this manner and pushing the water blocking the introduction passage out in a single burst using the wet gas, the water is discharged through the valve port into the discharge passage.

With this method, however, purging cannot be performed until the introduction passage is completely blocked by the water. Therefore, in a case where the system including the fluid control valve is stopped forcefully due to a failure or the like, the water accumulated in the curved portion may freeze while the system is stopped such that the introduction passage remains blocked. In this case, the flow of wet gas cannot be controlled when the system is reactivated.

An object of this invention is to provide a fluid control valve with which water can be purged without blocking an introduction passage.

According to an aspect of this invention, a fluid control valve disposed in a wet gas flow passage to control a flow of a wet gas is provided. The fluid control valve includes an introduction passage for introducing the wet gas into the fluid control valve, a filter including mesh for removing foreign matter contained in the wet gas flowing through the introduction passage, a discharge passage that includes a valve port disposed above the introduction passage and discharges the wet gas that has passed through the filter from the fluid control valve through the valve port, and a valve portion that opens and closes the valve port by means of a valve body. In this fluid control valve, the filter is disposed in a lowermost portion of the introduction passage.

DESCRIPTION OF EMBODIMENTS

Embodiments of this invention will be described below with reference to the figures and so on.

A fuel cell is formed by sandwiching an electrolyte membrane between an anode electrode serving as a fuel electrode and a cathode electrode serving as an oxidant electrode. The fuel cell generates power using anode gas containing hydrogen that is supplied to the anode electrode and cathode gas containing oxygen that is supplied to the cathode electrode. Electrode reactions occurring in the respective electrodes, i.e. the anode electrode and the cathode electrode, are as follows.

anode electrode: $2H_2 \rightarrow 4H^+ + 4e^-$ (1)

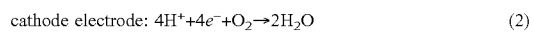

cathode electrode: $4H^+ + 4e^- + O_2 \rightarrow 2H_2O$ (2)

As a result of the electrode reactions shown in (1) and (2), the fuel cell generates approximately 1 volt of electromotive force.

Figure 1:
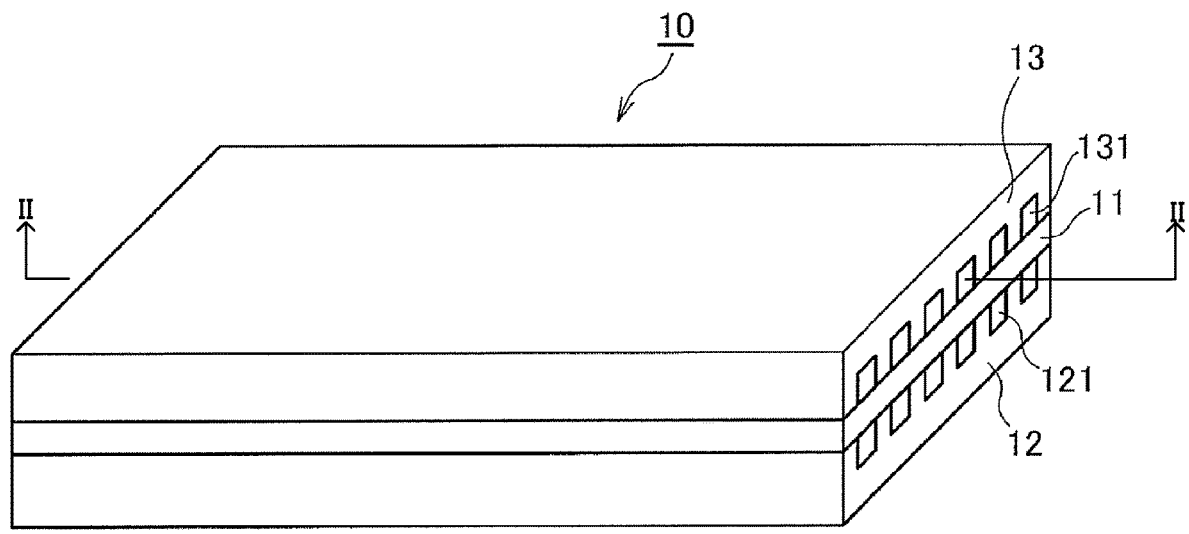
FIG. 1 is a schematic perspective view showing a fuel cell according to an embodiment of this invention.
Figure 2:
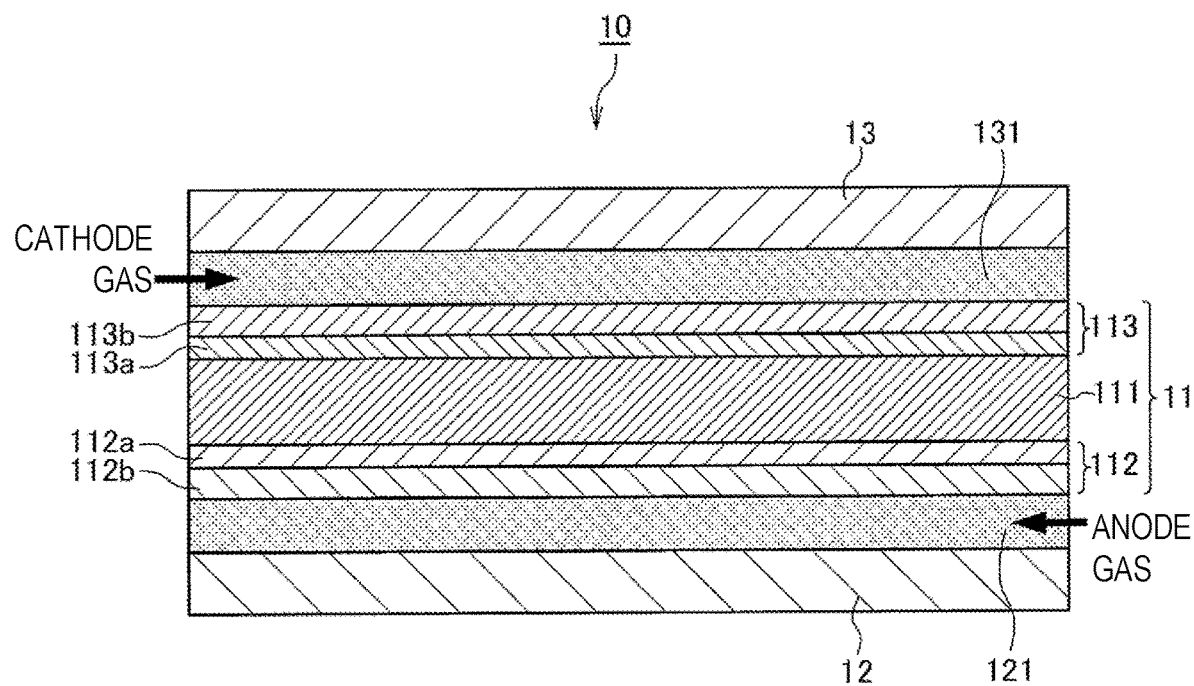
FIG. 2 is a II-II sectional view of the fuel cell shown in FIG. 1.

FIG. 1 is a schematic perspective view showing a fuel cell 10 according to an embodiment of this invention. FIG. 2 is a II-II sectional view of the fuel cell 10 shown in FIG. 1.

As shown in FIGS. 1 and 2, the fuel cell 10 includes a membrane electrode assembly (MEA) 11, and an anode separator 12 and a cathode separator 13 disposed so as to sandwich the MEA 11.

The MEA 11 includes an electrolyte membrane 111, an anode electrode 112, and a cathode electrode 113. In the MEA 11, the anode electrode 112 is provided on one surface of the electrolyte membrane 111, and the cathode electrode 113 is provided on the other surface.

The electrolyte membrane 111 is a proton-conductive ion exchange membrane formed from a fluorine-based resin. The electrolyte membrane 111 exhibits favorable electrical conductivity in a moistened condition.

The anode electrode 112 includes a catalyst layer 112a and a gas diffusion layer 112b. The catalyst layer 112a contacts the electrolyte membrane 111. The catalyst layer 112a is formed from platinum or carbon black particles carrying platinum or the like. The gas diffusion layer 112b is provided on an outer side of the catalyst layer 112a so as to contact the anode separator 12. The gas diffusion layer 112b is formed from a conductive member having a sufficient gas diffusion property. The gas diffusion layer 112b is formed from carbon cloth woven using thread constituted by carbon fiber, for example.

The cathode electrode 113, similarly to the anode electrode 112, includes a catalyst layer 113a and a gas diffusion layer 113b. The catalyst layer 113a is disposed between the electrolyte membrane 111 and the gas diffusion layer 113b, while the gas diffusion layer 113b is disposed between the catalyst layer 113a and the cathode separator 13.

The anode separator 12 contacts the gas diffusion layer 112b of the anode electrode 112. A plurality of groove-shaped anode gas flow passages 121 are provided on the side of the anode separator 12 that contacts the gas diffusion layer 112b in order to supply the anode gas to the anode electrode 112.

The cathode separator 13 contacts the gas diffusion layer 113b of the cathode electrode 113. A plurality of groove-shaped cathode gas flow passages 131 are provided on the side of the cathode separator 13 that contacts the gas diffusion layer 113b in order to supply the cathode gas to the cathode electrode 113.

The anode separator 12 and the cathode separator 13 are configured such that a flow direction of the anode gas flowing through the anode gas flow passages 121 is opposite to a flow direction of the cathode gas flowing through the cathode gas flow passages 131. It should be noted that the anode separator 12 and the cathode separator 13 may be configured such that the respective gases flow in identical flow directions.

When the fuel cell 10 is employed as a power supply for an automobile, a large amount of power is required, and therefore the fuel cell 100 is used in a fuel cell stack 2 constructed by laminating several hundred of the fuel cells 10. A fuel cell system 100 for supplying the anode gas and the cathode gas to the fuel cell stack 2 is then constructed, whereupon power for driving the vehicle is extracted therefrom.

The fuel cell system 1 according to an embodiment of this invention will be described below with reference to FIGS. 3 and 4.

Figure 3:
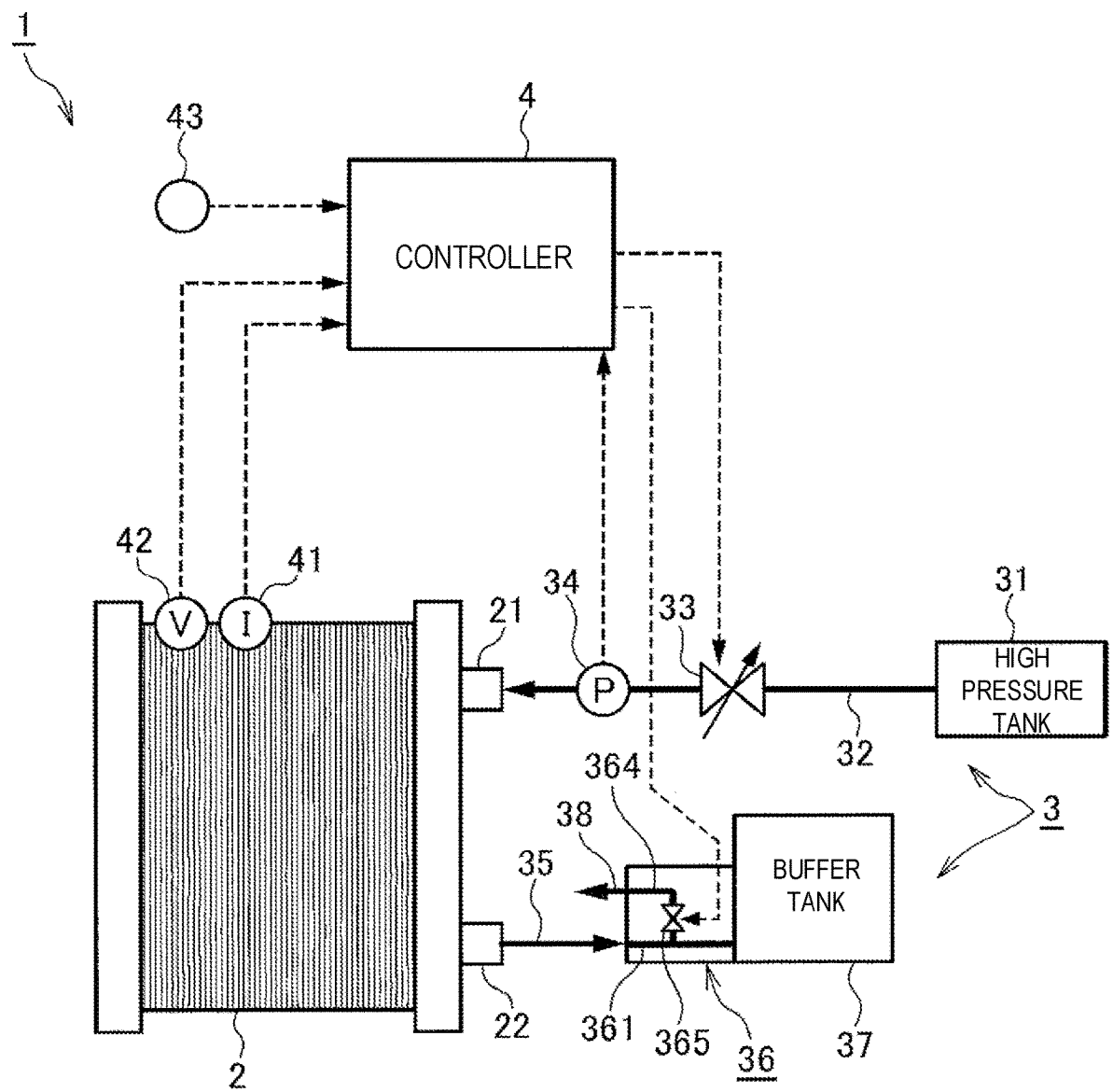
FIG. 3 is a schematic view showing a fuel cell system according to this embodiment of the invention.
Figure 4:
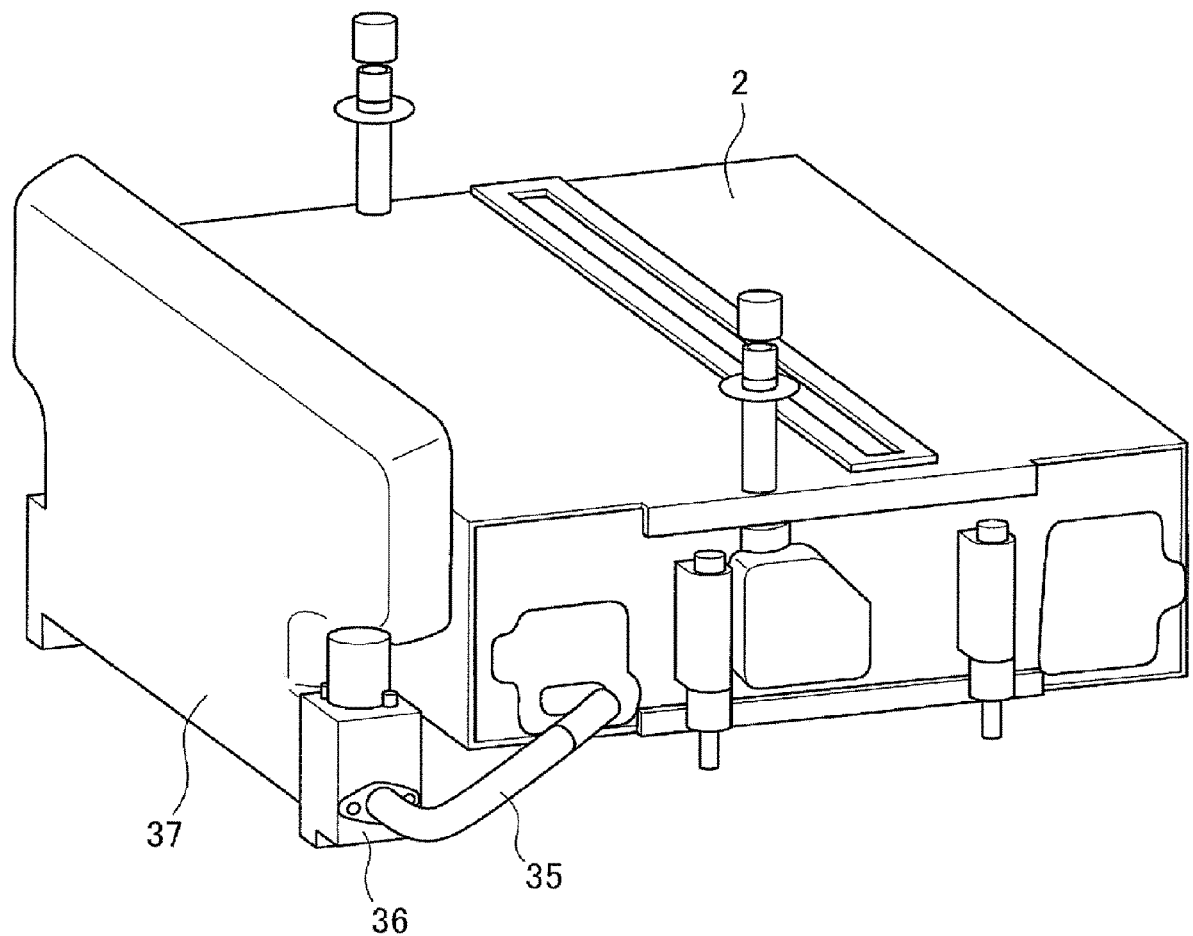
FIG. 4 is a perspective view showing positional relationships between a fuel cell stack, a purge valve, and a buffer tank.

FIG. 3 is a schematic view showing a configuration of the fuel cell 1 according to this embodiment of the invention, and FIG. 4 is a perspective view showing positional relationships between the fuel cell stack 2, a purge valve 36, and a buffer tank 37.

The fuel cell system 1 includes the fuel cell stack 2, an anode gas supply device 3, and a controller 4.

The fuel cell stack 2 is a laminated battery formed by laminating a plurality of the fuel cells 10, and generates power upon reception of supplies of the anode gas and the cathode gas. The fuel cell stack 2 generates power required to drive a vehicle, for example power required to drive a motor.

A cathode gas supply/discharge device of the fuel cell stack 2 and a cooling device for cooling the fuel cell stack 2 are not main parts of this invention, and have therefore been omitted from the figures to make the invention more easily comprehensible. It should be noted that in the fuel cell system 1, air is used as the cathode gas.

The anode gas supply device 3 includes a high pressure tank 31, an anode gas supply passage 32, a pressure regulating valve 33, a pressure sensor 34, an anode gas discharge passage 35, the purge valve 36, the buffer tank 37, and a purge passage 38.

The high pressure tank 31 stores the anode gas to be supplied to the fuel cell stack 2 in a high pressure condition.

The anode gas supply passage 32 is a passage for supplying anode gas discharged from the high pressure tank 31 to the fuel cell stack 2. A first end portion of the anode gas supply passage 32 is connected to the high pressure tank 31, and a second end portion is connected to an anode gas inlet portion 21 of the fuel cell stack 2.

The pressure regulating valve 33 is provided in the anode gas supply passage 32. The pressure regulating valve 33 regulates the anode gas discharged from the high pressure tank 31 to a desired pressure, and supplies the anode gas thus to the fuel cell stack 2. The pressure regulating valve 33 is a solenoid valve, an opening of which can be adjusted either continuously or in steps. The opening of the pressure regulating valve 33 is controlled by the controller 4.

The pressure sensor 34 is provided in the anode gas supply passage 32 downstream of the pressure regulating valve 33. The pressure sensor 34 detects a pressure of the anode gas flowing through the anode gas supply passage 32 downstream of the pressure regulating valve 33. In the fuel cell system 1, the anode gas pressure detected by the pressure sensor 34 is used as an overall pressure (an anode pressure) of an anode system that includes the respective anode gas flow passages 121 and the buffer tank 37.

The anode gas discharge passage 35 is a passage through which anode off-gas discharged from the fuel cell stack 2 flows. The anode off-gas is a mixed gas containing surplus anode gas not used in the electrode reaction, and impure gases such as nitrogen and moisture (water vapor and liquid water) that pass into the anode gas flow passages 121 from the cathode gas flow passages 131. A first end portion of the anode gas discharge passage 35 is connected to an anode gas outlet portion 22 of the fuel cell stack 2, and a second end portion is connected to the purge valve 36. The anode off-gas discharged from the fuel cell stack 2 is a wet gas containing moisture, and therefore the anode gas discharge passage 35 serves as a wet gas flow passage through which a wet gas flows. As shown in FIG. 4, to realize purging by gravity in the fuel cell system 1, a position of the second end portion of the anode gas discharge passage 35 is set to be lower than a position of the first end portion.

The purge valve 36 is a fluid control valve that controls a discharge condition (for example, discharging/no discharging) of the anode off-gas, i.e. whether or not the anode off-gas is discharged into the purge passage 38. A structure of the purge valve 36 will be described in detail below with reference to FIG. 5, and will therefore be described only briefly here.

As shown in FIG. 3, an introduction passage 361 and a discharge passage 364 are formed in the interior of the purge valve 36. A first end portion of the introduction passage 361 is connected to the anode gas discharge passage 35, and a second end portion is connected to the buffer tank 37. The discharge passage 364 is connected between the introduction passage 361 and the purge passage 38 to enable communication therebetween. A valve portion 365 that is opened and closed by the controller 4 is provided between the introduction passage 361 and the discharge passage 364. The discharge condition of the anode off-gas, i.e. whether or not the anode off-gas is discharged from the introduction passage 361 into the discharge passage 364, or in other words whether or not the anode off-gas is discharged into the purge passage 38, is controlled by opening and closing the valve portion 365.

The buffer tank 37 temporarily stores the anode off-gas that has passed through the anode gas discharge passage 35 and the introduction passage 361 of the purge valve 36. The anode off-gas stored in the buffer tank 37 flows out of the introduction passage 361 into the discharge passage 364 when the valve portion 365 of the purge valve 36 is opened, and as a result, the anode off-gas is discharged into the purge passage 38.

A first end portion of the purge passage 38 is connected to the discharge passage 364 of the purge valve 36. The anode off-gas discharged into the purge passage 38 is caused to converge with the cathode gas in a cathode gas discharge passage or the like, for example, in order to dilute hydrogen contained in the anode off-gas, whereupon the anode off-gas is finally discharged to the exterior of the fuel cell system 1.

The controller 4 is constituted by a microcomputer including a central processing unit (CPU), a read-only memory (ROM), a random access memory (RAM), and an input/output interface (I/O interface).

Signals from various sensors for detecting operating conditions of the fuel cell system 1, such as the aforementioned pressure sensor 34, a current sensor 41 that detects an output current of the fuel cell stack 2, a voltage sensor 42 that detects an output voltage of the fuel cell stack 2, and an accelerator stroke sensor 43 that detects a depression amount of an accelerator pedal, are input into the controller 4.

The controller 4 controls the pressure regulating valve 33 on the basis of the operating conditions of the fuel cell system 1 in order to control a flow rate and a pressure of the anode gas supplied to the fuel cell stack 2. Further, in order to discharge the impure gases that pass into the anode gas flow passage 121 from the cathode gas flow passage 131 to the exterior of the fuel cell system 1, the controller 4 discharges the anode off-gas into the purge passage 38 as required by opening the valve portion 365 of the purge valve 36.

Figure 5:
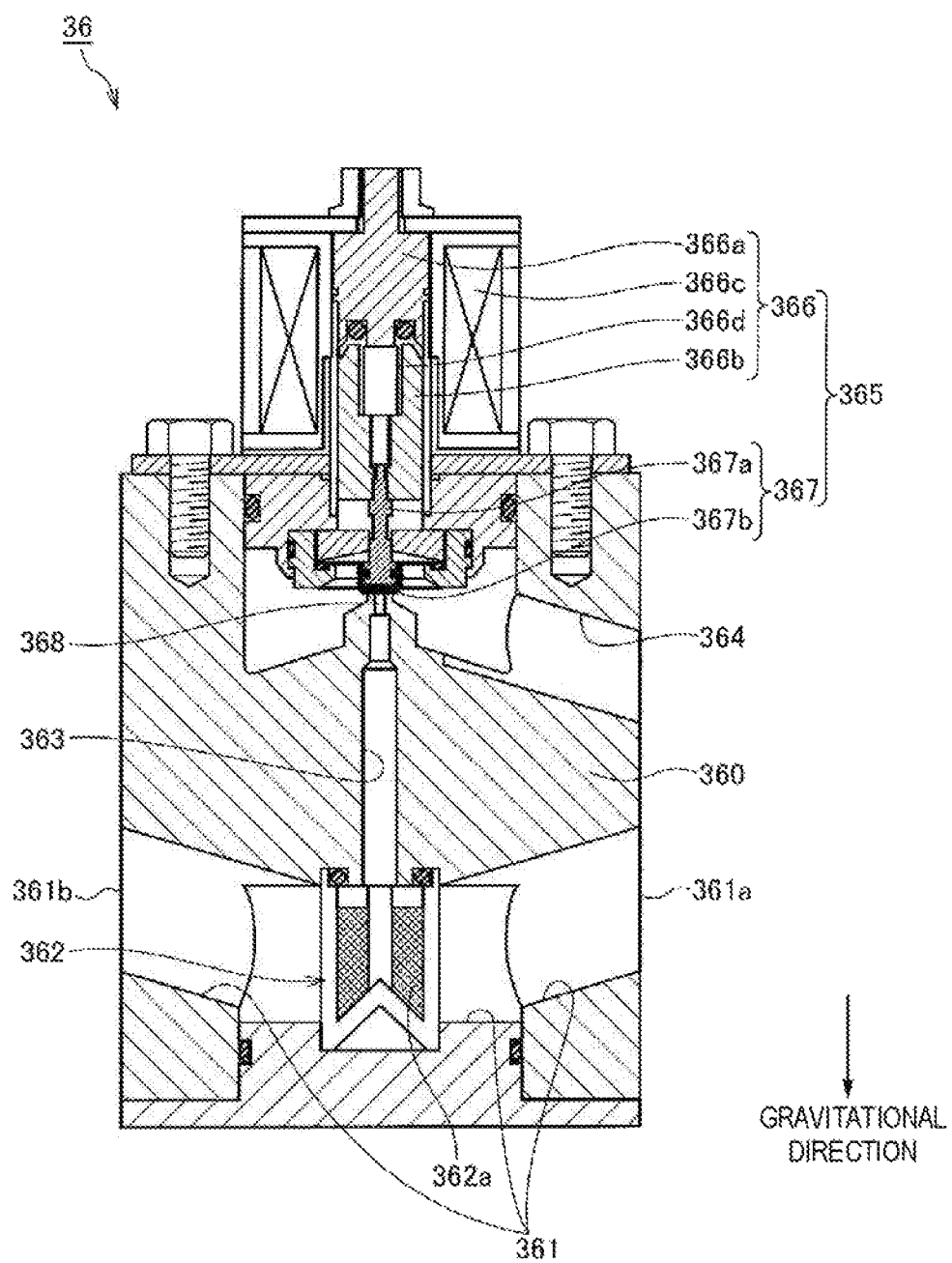
FIG. 5 is a schematic sectional view showing a purge valve according to this embodiment of the invention.

FIG. 5 is a schematic sectional view showing the purge valve 36 serving as a fluid control valve for controlling a flow of wet gas.

As shown in FIG. 5, the purge valve 36 includes a housing 360, the introduction passage 361, a filter 362, a guiding passage 363, the discharge passage 364, and the valve portion 365.

The introduction passage 361 is formed in the housing 360. A first port 361a constituting a first end portion of the introduction passage 361 is connected to the anode gas discharge passage 35, and a second port 361b constituting a second end portion is connected to the buffer tank 37. The introduction passage 361 is formed in a shape that allows water infiltrating the introduction passage 361 to flow down toward a specific location of the introduction passage 361. More specifically, the introduction passage 361 is formed to incline downward toward a central part from the respective end portions thereof such that the central part curves downward. Hence, the central part of the introduction passage 361 is configured to project downward in a gravitational direction. By configuring the introduction passage 361 in this manner, water flows down toward the central part of the introduction passage 361, and is therefore more likely to accumulate in the central part. The part of the introduction passage 361 in which water accumulates will be referred to hereafter as a "water retention portion".

The filter 362 is disposed in a lowermost portion of the central part of the introduction passage 361, or in other words in the water retention portion of the introduction passage 361. The filter 362 is formed in a cylindrical shape, for example, and mesh 362a formed with a large number of small holes is provided on a side face of the cylinder. Wire mesh formed by weaving metal wire or the like, a metal plate or the like in which holes are formed, and so on may be used as the mesh 362a. Foreign matter contained in the anode off-gas is removed by the mesh 362a of the filter 362, thereby preventing the foreign matter from becoming caught or the like in the valve portion 365 disposed downstream of the filter 362.

The guiding passage 363 is formed in the housing 360. The guiding passage 363 is formed to extend upward from an upper surface side (an upper portion) of the filter 362. The guiding passage 363 guides the anode off-gas that has passed through the filter 362 upward from the filter 362. An upper end of the guiding passage 363 is formed as an open end, and constitutes a valve port 368 that functions as a valve seat. Hence, the valve port 368 is disposed above the introduction passage 361.

The discharge passage 364 is formed in the housing 360. A first end portion of the discharge passage 364 communicates with the upper end of the guiding passage 363 via the valve port 368, and a second end portion is connected to the purge passage 38.

The valve portion 365 includes a driving portion 366 and a valve body 367. The driving portion 366 of the valve portion 365 drives the valve body 367, and the valve body 367 opens and closes the valve port 368 on the basis of a driving force generated by the driving portion 366.

The driving portion 366 includes a fixed core 366a, a movable core 366b, and a coil 366c. The driving portion 366 also includes a spring 366d provided between the fixed core 366a and the movable core 366b in order to bias the movable core 366b in a direction (a downward direction in the figure) heading away from the fixed core 366a. When the coil 366c is energized, the fixed core 366a and the movable core 366b are magnetized such that the movable core 366b is driven in a direction (an upward direction in the figure) heading toward the fixed core 366a by a mutual attraction force.

The valve body 367 includes a valve rod portion 367a and a diaphragm 367b. The valve rod portion 367a is fixed to the movable core 366b via an insert nut so as to move together with the movable core 366b. The diaphragm 367b is disposed on a tip end of the valve rod portion 367a. An outer edge part of the diaphragm 367b is fixed to the housing 360, while a central part is fixed to the valve rod portion 367a.

When the coil is not energized, the movable core 366b of the valve portion 365 of the purge valve 36 configured as described above is biased in the downward direction of the figure by the spring 366d. Hence, when the coil is not energized, the valve rod portion 367a is likewise biased in the downward direction of the figure, and as a result, the valve port 368 (the upper end of the guiding passage 363) is closed by the diaphragm 367b.

When the coil is energized, on the other hand, the movable core 366b is attracted upward by the fixed core 366a, and therefore moves in the upward direction of the figure against a biasing force of the spring 366d. Accordingly, the valve rod portion 367a moves in the upward direction of the figure together with the movable core 366b such that the diaphragm 367b separates from the valve port 368, and as a result, the valve port 368 opens.

Next, actions and effects of the purge valve 36 according to this embodiment will be described.

Water may infiltrate the introduction passage 361 of the purge valve 36 from the anode gas discharge passage 35 even after the fuel cell system 1 is stopped. Therefore, if the valve port 368 is disposed below the introduction passage 361, the water infiltrating the introduction passage 361 is guided into the valve port 368 by gravity such that when the fuel cell system 1 is stopped in a low temperature environment, the valve port 368 and the valve body 367 freeze. To avoid this situation, the valve port 368 of the purge valve 36 according to this embodiment is disposed above the introduction passage 361.

When the fuel cell system 1 is activated, air that infiltrated the system while the system was stopped is intermixed in the anode gas flow passages 121. When the system is activated, therefore, the air in the anode gas flow passages 121 is discharged into the anode gas discharge passage 35 by supplying additional anode gas from the high pressure tank 31. At this time, the valve port 368 is opened by the valve body 367 of the purge valve 36 in order to discharge the anode off-gas, including the air discharged into the anode gas discharge passage 35, into the purge passage 38. If the valve port 368 and the valve body 367 freeze while the fuel cell system 1 is stopped, however, the anode off-gas cannot be discharged into the purge passage 38 when the system is reactivated.

By disposing the valve port 368 above the introduction passage 361, as in this embodiment, the problem described above can be solved. On the other hand, when the valve port 368 is positioned above the introduction passage 361, liquid water flowing into the introduction passage 361 while the fuel cell system 1 is operative cannot be discharged to the outside using gravity even by opening the valve port 368.

Figure 7A:
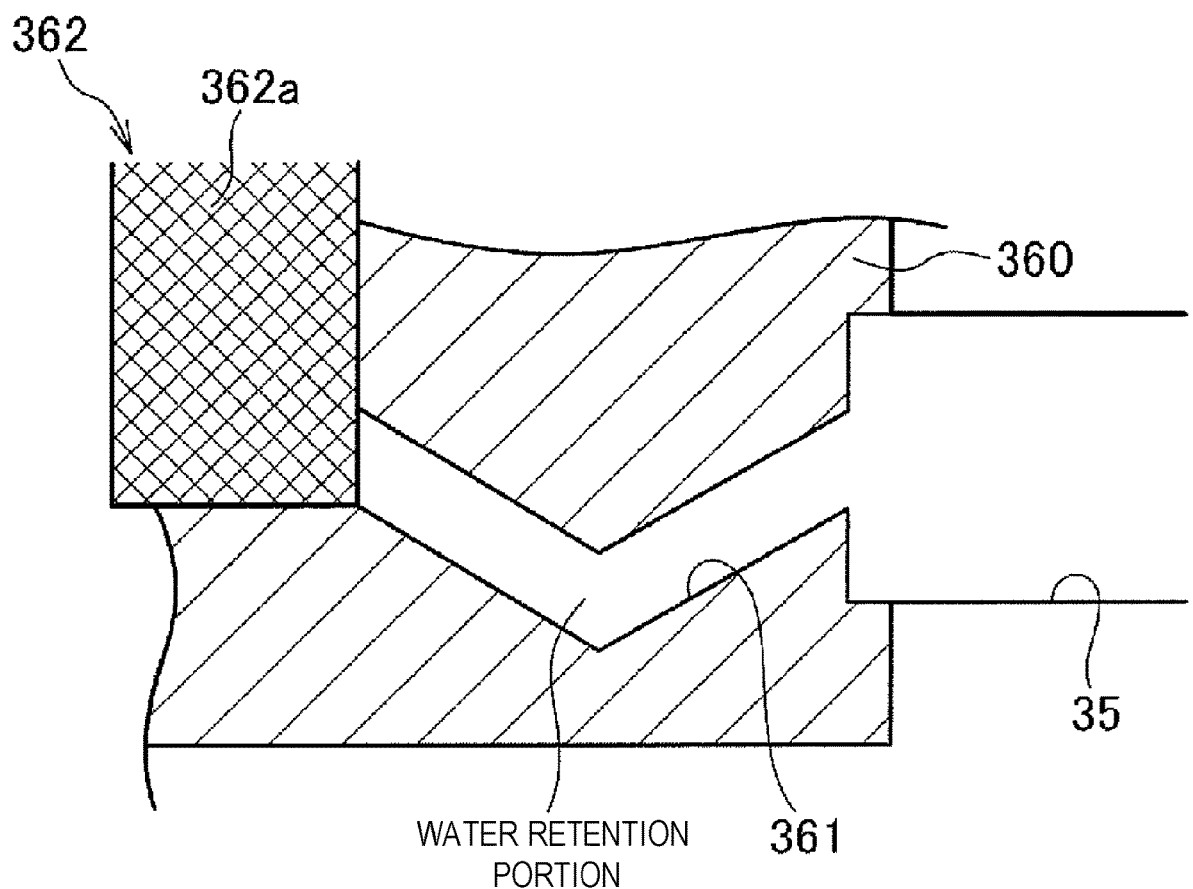
FIG. 7A is a view illustrating an example of a flow of water through an introduction passage of a purge valve according to a comparative example.
Figure 7B:
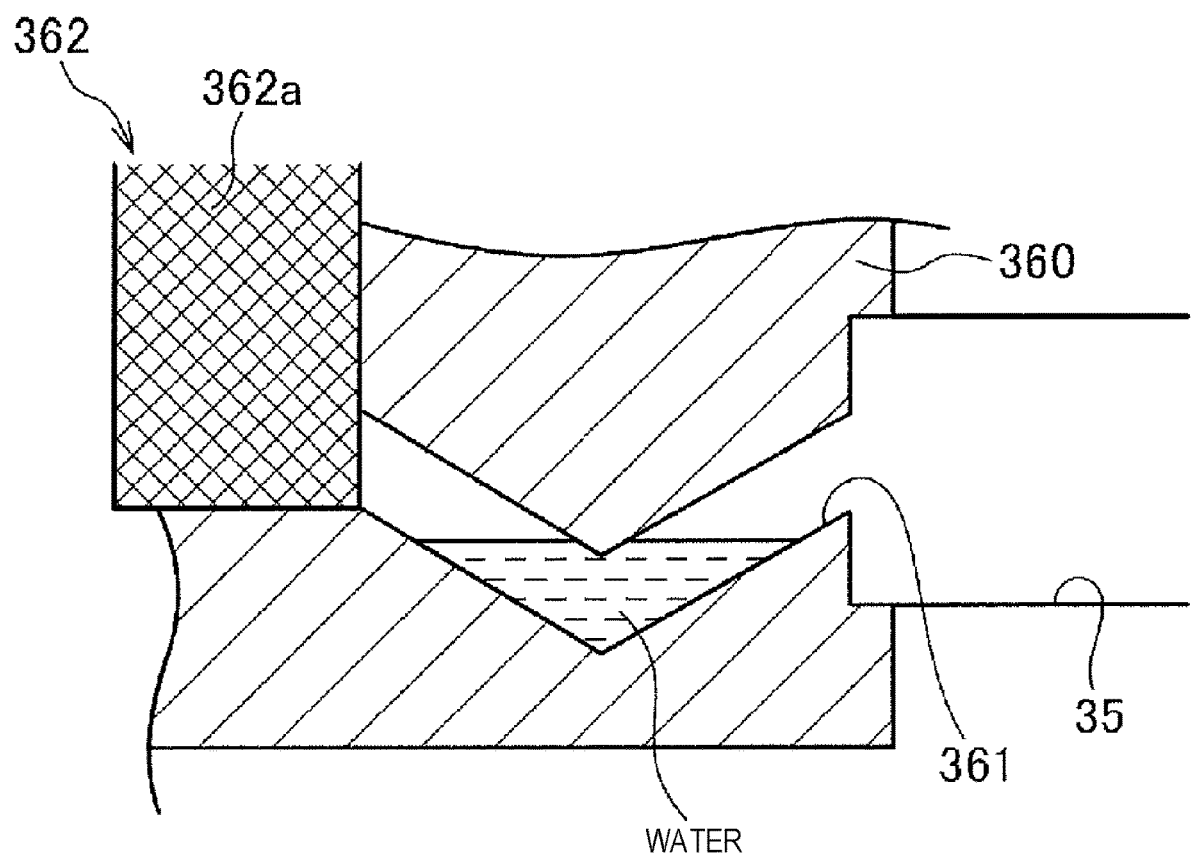
FIG. 7B is a view illustrating an example of the flow of water through the introduction passage of the purge valve according to this comparative example.
Figure 7C:
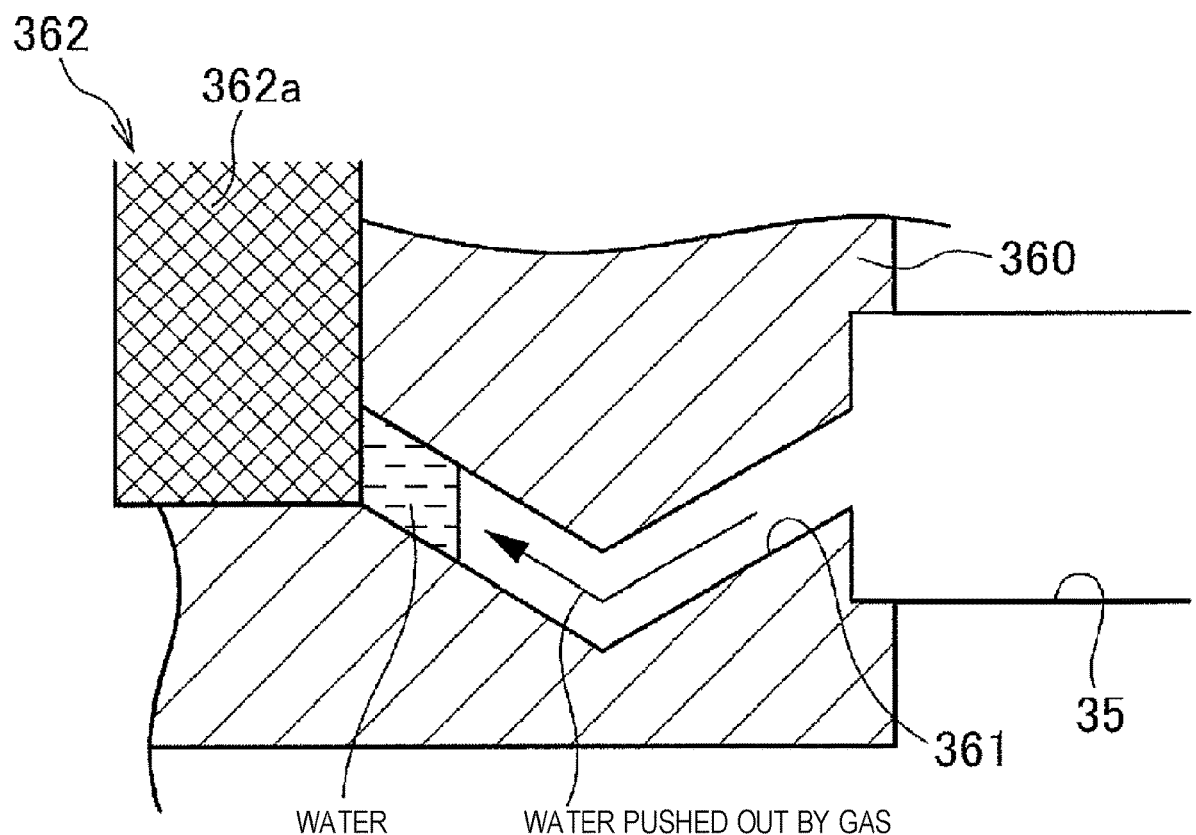
FIG. 7C is a view illustrating an example of the flow of water through the introduction passage of the purge valve according to this comparative example.

Therefore, to discharge the liquid water that flows into the introduction passage 361 while the system is operative in a case where the valve port 368 is positioned above the introduction passage 361, the introduction passage 361 may be configured as illustrated by a comparative example shown in FIGS. 7A to 7C, for example. In other words, the introduction passage 361 may be formed in a curved shape on an upstream side of the filter 362 so as to project downward in the gravitational direction. When the introduction passage 361 is formed in this manner, a part of the introduction passage 361 functions as the water retention portion. It should be noted that by setting a passage diameter of the introduction passage 361 to be smaller than a passage diameter of the anode gas discharge passage 35, water accumulates in the water retention portion more quickly.

When the introduction passage 361 is configured in this manner, water accumulates gradually in the water retention portion while the system is operative. Eventually, as shown in FIG. 7B, the water completely blocks the introduction passage 361. When the valve port 368 is opened in this blocked condition, the water blocking the introduction passage 361 is pushed out in a single burst by a gas pressure of the anode off-gas, as shown in FIG. 7C. As a result, the water in the introduction passage 361 is discharged into the discharge passage 364 through the valve port 368.

With the method illustrated by the comparative example shown in FIGS. 7A to 7C, however, purging cannot be performed until the introduction passage 361 is completely blocked by water. Therefore, in a case where the fuel cell system 1 is stopped forcefully due to a failure or the like, the water that accumulated in the water retention portion while the system was operative may freeze while the system is stopped such that the introduction passage 361 remains blocked. In this case, the anode off-gas cannot be discharged into the purge valve 38 when the system is reactivated.

It is therefore desirable to ensure that water flowing into the introduction passage 361 during an operation of the fuel cell system 1 can be discharged into the discharge passage 364 without blocking the introduction passage 361 in a case where the valve port 368 is disposed above the introduction passage 361.

Hence, in this embodiment, as shown in FIG. 5, the filter 362 is disposed in the water retention portion serving as the lowermost portion of the introduction passage 361. The present inventors found that by disposing the filter 362 in this manner, the water in the introduction passage 361 can be discharged into the discharge passage 364 when the valve port 368 is opened without blocking the introduction passage 361.

This finding will now be described. When the filter 362 is disposed in the water retention portion of the introduction passage 361, as in this embodiment, the water in the water retention portion is suctioned up over the surface of the mesh 362a of the filter 362 ahead of the anode off-gas in accordance with a differential pressure between a pressure (a pressure corresponding to the anode pressure) in the introduction passage 361 and a pressure (a pressure corresponding to atmospheric pressure) in the discharge passage 364 when the valve port 368 is opened. This water suction phenomenon occurs as a result of a water film that is formed in the small holes of the mesh 362a by the surface tension of the water itself and spreads gradually over the surface of the mesh 362a in the upward direction of the figure. The water suctioned up over the surface of the mesh 362a in this manner rises through the guiding passage 363 on the basis of the aforesaid differential pressure, and is discharged into the discharge passage 364.

By disposing the filter 362 in the lowermost portion (the water retention portion) of the introduction passage 361 in this manner, the water in the water retention portion can be discharged into the discharge passage 364 ahead of the anode off-gas simply by opening the valve port 368.

The purge valve 36 according to this embodiment is connected to the anode gas discharge passage 35 in order to control a flow of the anode off-gas. The purge valve 36 includes the introduction passage 361 for introducing the anode off-gas into the purge valve 36, the filter 362 including the mesh 362a that removes foreign matter contained in the anode off-gas flowing through the introduction passage 361, the discharge passage 364 that includes the valve port 368 positioned above the introduction passage 361 and discharges the anode off-gas that has passed through the filter 362 from the purge valve 36 through the valve port 368, and the valve portion 365 that opens and closes the valve port 368 using the valve body 367.

In the purge valve 36, the filter 362 is disposed in the lowermost portion of the introduction passage 361. As a result, the water that has accumulated in the lowermost portion (the water retention portion) of the introduction passage 361 can be suctioned up over the surface of the mesh 362a of the filter 362, and the water suctioned up by the mesh 362a can be discharged into the discharge passage 364 using the differential pressure between the pressure in the introduction passage 361 and the pressure in the discharge passage 364 when valve port 368 is opened.

Hence, the water that has accumulated in the lowermost portion of the introduction passage 361 can be discharged into the discharge passage 364 by opening the valve port 368 even when the introduction passage 361 is not completely blocked by the water during an operation of the fuel cell system 1. Therefore, even when the fuel cell system 1 is stopped forcefully due to a failure, a situation in which the introduction passage 361 is completely blocked by frozen water upon reactivation of the system can be suppressed.

With the purge valve 36 according to this embodiment, in contrast to the comparative example, the introduction passage 361 does not have to be completely blocked by water, and therefore the passage diameter of the introduction passage 361 does not have to be made smaller than the passage diameter of the anode gas discharge passage 35 to ensure that the water accumulates more easily. Hence, when the purge valve 36 according to this embodiment is used in the fuel cell system 1, a performance of the fuel cell system 1 can be improved as described below.

In a dead end anode type fuel cell system 1 such as the system according to this embodiment, in which the anode off-gas discharged into the anode gas discharge passage 35 is pushed into the buffer tank 37 rather than being returned to the anode gas supply passage 32, the passage diameter of the introduction passage 361 does not have to be reduced. Hence, an increase in pressure loss in the introduction passage 361 when the anode off-gas is pushed into the buffer tank 37 can be suppressed. Accordingly, the anode pressure can be kept low when the anode off-gas is pushed into the buffer tank 37, enabling an improvement in fuel efficiency. Moreover, a pressure exerted on components such as the anode gas supply passage 32 and the fuel cell stack 2 can be kept low, enabling an improvement in the durability of these components.

Figure 6:
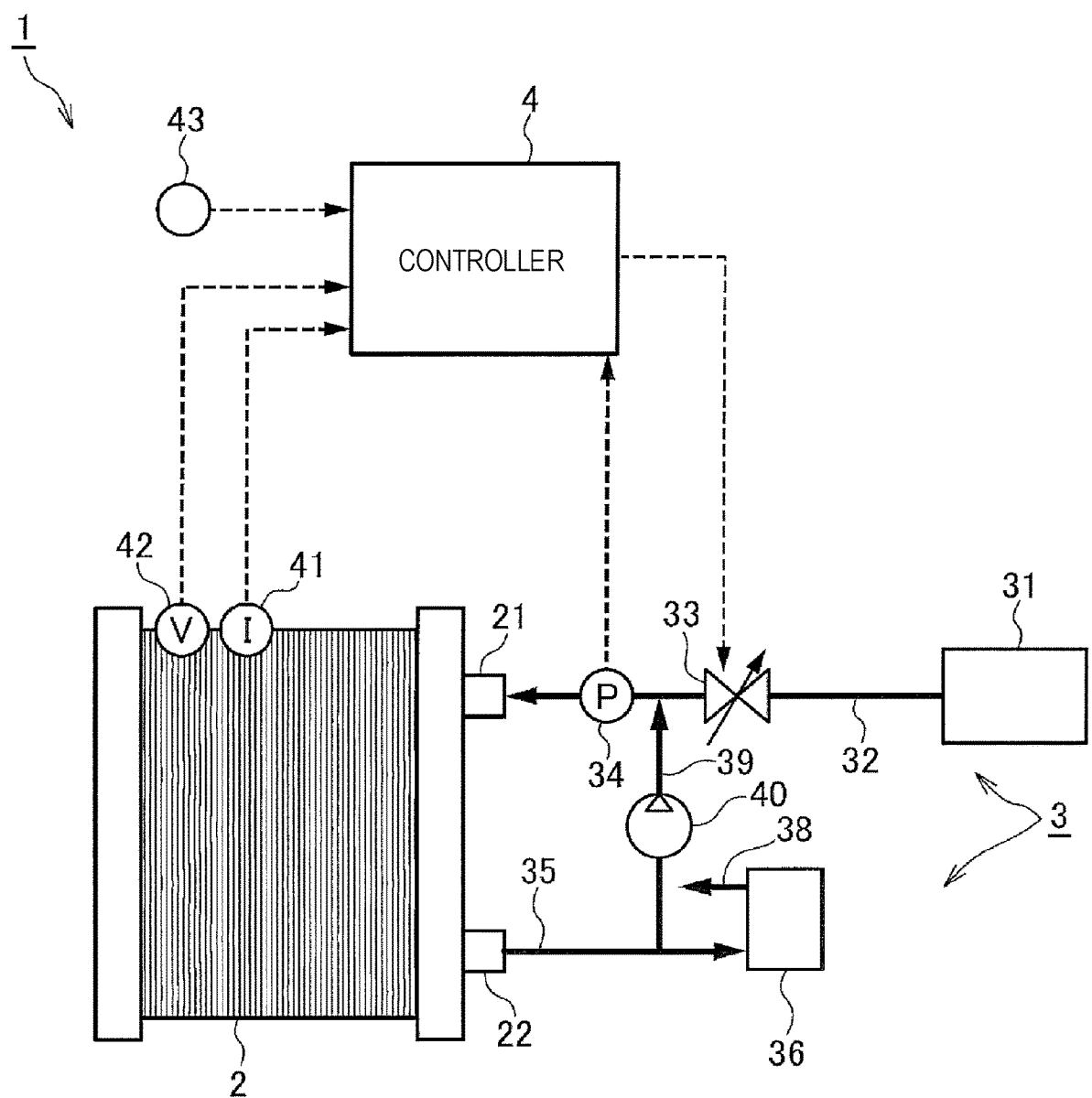
FIG. 6 is a schematic view showing a fuel cell system according to another embodiment of this invention.

Meanwhile, in a circulation type fuel cell system 1 shown in FIG. 6, in which the anode off-gas is returned to the anode gas supply passage 32 by a circulation pump 40 provided in a circulation passage 39 that connects the anode gas discharge passage 35 to the anode gas supply passage 32, an increase in pressure loss in the introduction passage 361 when the anode off-gas is discharged through the purge valve 36 can be suppressed. Accordingly, a discharge flow of the anode off-gas per unit time can be increased, enabling a reduction in an open period of the purge valve, and as a result, wasteful discharge of the hydrogen in the anode off-gas can be suppressed. It should be noted that when the fuel cell system 1 is a circulation type system, the second port 361b of the purge valve 36 may be kept closed.

Embodiments of this invention were described above, but the above embodiments are merely examples of applications of the invention, and the technical scope of this invention is not limited to the specific configurations of the above embodiments.

For example, in the above embodiments, the introduction passage 361 is inclined toward the central part from the respective end portions so that the central part of the introduction passage 361 projects downward in the gravitational direction. However, the introduction passage 361 may take any shape that allows the water in the introduction passage 361 to flow down toward a specific location of the introduction passage 361, and therefore the introduction passage 361 is not limited to the shape described above. For example, a part of the introduction passage 361 may be hollowed out into a bowl shape so as to form a curved surface that inclines in the gravitational direction, and the hollowed out part may be used as the water retention portion.

In the above embodiments, a purge valve used in the fuel flow system 1 was described as an example of a fluid control valve. However, a fluid control valve is not limited to being used in a fuel cell system, and a fluid control valve may be employed in any system that uses a wet gas.

This application claims priority based on Patent Application No. 2014-45174, filed with the Japan Patent Office on Mar. 7, 2014, the entire contents of which are incorporated herein by reference.

The invention claimed is:

1. A fluid control valve connected to a wet gas flow passage in order to control a flow of wet gas, comprising:
    an introduction passage for introducing the wet gas into the fluid control valve;
    a filter that is formed in a tubular shape and has a hole in a tubular side face thereof such that water is suctioned up over the tubular side face;
    a guiding passage disposed above the filter provided to extend upward from an upper portion of the filter;
    a valve port disposed above the introduction passage and constituted by an upper portion open end of the guiding passage;
    a discharge passage that discharges the wet gas that has passed through the filter from the fluid control valve through the valve port; and
    a valve portion that opens and closes the valve port using a valve body,
    wherein the filter is configured to be disposed in a lowermost point of the introduction passage.

2. The fluid control valve as defined in claim 1, wherein the introduction passage is formed to incline downward toward the lowermost point.

3. The fluid control valve as defined in claim 1, wherein the fluid control valve is a purge valve for discharging anode off-gas serving as a wet gas discharged from a fuel cell to an exterior of a fuel cell system.

4. A fuel cell system comprising:
    the fluid control valve according to claim 3,
    wherein the fuel cell system further comprising:
        an anode gas discharge passage serving as the wet gas flow passage through which the anode off-gas discharged from the fuel cell flows; and
        a buffer portion for storing the anode off-gas discharged from the fuel cell,
        wherein the fuel cell system is a dead end anode fuel cell system, in which the anode off-gas discharged into the anode gas discharge passage is pushed into the buffer portion.

5. The fuel cell system according to claim 4, wherein the introduction passage of the fluid control valve includes two ports through which the wet gas is introduced into the introduction passage,
    wherein one of the two ports is connected to the anode gas discharge passage, and
    wherein another of the two ports is connected to the buffer portion.

* * * * *